Patented Aug. 4, 1931

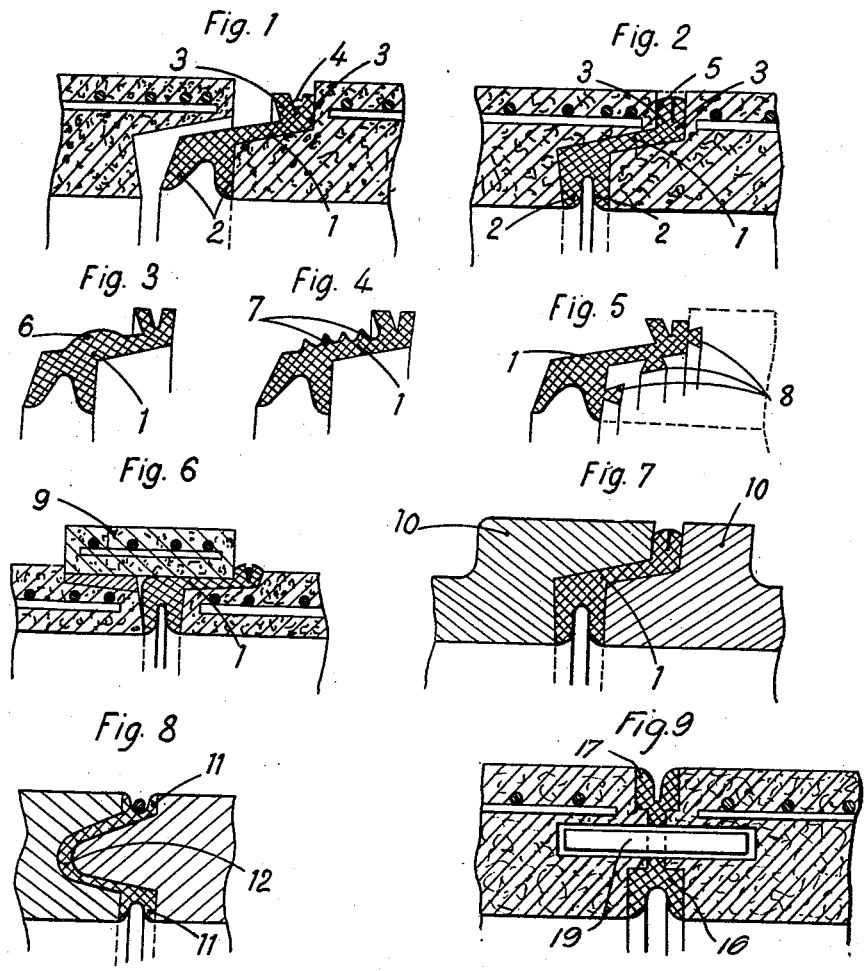

1,817,870

UNITED STATES PATENT OFFICE

LÉON BILLÉ, OF NOGENT-SUR-MARNE, FRANCE

JOINT FOR PIPES

Application filed March 12, 1927, Serial No. 174,862, and in France March 24, 1926.

This invention relates to a joint for pipes constituted by a ring member of rubber or other suitable material having on both faces a U-shaped or V-shaped grooved bead, rim or burr the wings or limbs of which are compressed between the ends of the pipes to be assembled. This compression takes place when the pipes are assembled and afterwards by internal or external pressure, as the case may be.

Constructional examples of the joint according to the present invention are illustrated in the accompanying drawings in which:

Figure 1 is a section through the joint before the ends of the pipes are joined;

Figure 2 is a similar section after the ends of the pipes are in position;

Figures 3, 4 and 5 are sections through variants of the joint;

Figure 6 is a section through a further assemblage of the ends of the pipes;

Figure 7 is a section through such assemblage when the pipes are thin;

Figure 8 is a section through a variant of the joint of Figure 1;

Fig. 9 is a section through a variant of the joint.

With reference to Figure 1, the joint according to the invention is shown in section just before the pipes are in engagment. This joint is essentially composed of a ring member 1 having a hollow or grooved inner bead or rim the wings or limbs 2 of which are suitably divergent, and a similar outer bead with wings 3 slightly divergent. As a general rule the ring member of this construction is preferably conical.

The joint is shown in Figure 2 after the pipes have been pushed into mutual engagement, the grooved beads or rims being slightly compressed. The central portion 1 of the ring member is likewise compressed between the pipe ends in engagement. The wings 2 of the inner bead are moved towards one another when the ends of the pipes are pushed into engagement. The pressure of the gas or liquid conveyed within the pipes compresses the U-shaped bead against the ends or shoulders of the pipes. In a similar manner the limbs or wings 3 of the outer V-shaped bead are pinched between the pipes pushed in position and have a tendency to open out under the action of external pressure when discharge or suction takes place within the pipes.

The ring members may be fastened to the projecting pipe-end by means of wire 4 (Figure 1) lying in the trough of the groove of the outer bead. The wire 4 may also be laid and knotted upon the central part 1 of the joint, the ends of the knot being brought down in the rubber.

After the pipes are laid the annular gap 5 (Figure 2) may be filled with asphalt putty or bitumen cord laid on hot or cold, or with cement. When laying pipes in water or in rainy weather, bitumen cord may be wound around the outer bead before the pipes are laid, the said cord being compressed owing to the force fit of the pipes.

In some cases the central part of the ring may have a raised portion 6 (Figure 3) or ribs 7 (Figure 4). The ring proper or the beads may moreover have dovetails 8 (Figure 5) embedded in the cement when the pipe is being manufactured for the purpose of fixing the ring member on the end of the pipe.

The ring member is generally made in one piece and of the same material throughout, but it may also be in a number of sections of dissimilar or of the same material.

With thin-walled pipes (Figure 6) a sleeve member 9 of reinforced concrete or of metal may be fitted beforehand to the end of a pipe to hold the ring in position when the other pipe is in engagement. Further means of joining thin walled pipes of cast iron, steel, stoneware, concrete, etc. . . . are shown in Figure 7 in which collars 10 cast or moulded with the pipes form the necessary thickness on the ends thereof.

Figure 8 shows a construction in which the U-shaped or V-shaped beads 11 are both on the same face of the ring member 12 and are disposed one inside and the other outside the pipe when the latter is laid.

The invention is not limited to the constructions illustrated in the drawings and covers any jointing means in which hermeticity is produced by pressure taking effect between the limbs or wings of internally or externally disposed hollow beads or rims which are thus pressed against the ends or shoulders of the pipes. This joint has great advantages in respect of resiliency, tightness and rapidity of laying operations. It is moreover very inexpensive.

In Figure 9, the two beads 16, 17, and the central ring are in vertical position. Irons 19 engaged into holes provided in the pipe ends afford a suitable alinement of the pipes.

Claims:

1. A packing of the class described comprising a flexible ring member, said ring having an annular bead on each end, and outer peripheral faces, each of said beads having a circumferential medial groove formed therein, said grooves dividing the beads of said ring to provide channel shaped peripheral edges therefor.

2. A packing of the class described comprising a flexible ring member having an annular bead on each end, said beads having annular grooves therein opening in reverse directions, and a wire ring engaged in the groove of one bead.

In testimony whereof I affix my signature.

LÉON BILLÉ.